UNITED STATES PATENT OFFICE.

VICTOR MORITZ GOLDSCHMIDT, OF CHRISTIANIA, NORWAY, ASSIGNOR TO TITAN CO. A/S., OF CHRISTIANIA, NORWAY.

TITANIUM PIGMENT AND METHOD OF ITS PRODUCTION.

1,389,191.      Specification of Letters Patent.      Patented Aug. 30, 1921.

No Drawing.      Application filed September 27, 1918. Serial No. 255,960.

*To all whom it may concern:*

Be it known that I, VICTOR MORITZ GOLDSCHMIDT, a subject of Norway, and a resident of Christiania, Kingdom of Norway, have invented certain new and useful Improvements in Titanium Pigments and Methods of Their Production, for which I have filed applications in Norway, February 28, 1917, and Canada, May 15, 1917, of which the following is a specification, this application being a continuation in part of my application Sr. No. 167,834, filed May 10, 1917.

This invention relates to the manufacture of titanium pigments containing trivalent titanium or titanium of a lower valence. The object of the invention is both the process whereby such pigments can be manufactured from titaniferous materials especially ilmenite or other titaniferous iron ores, and the product obtained.

Several methods have been suggested for the manufacture of titanium pigments, but all the pigments thus produced contain titanium in the tetravalent form. I have found that pigments consisting wholly or partly of trivalent titanium compounds or titanium compounds of lower valence may be easily produced, and that such pigments possess excellent qualities. Such titanium compounds all have a comparatively high refractive index and consequently a great hiding power when used in paints. If other conditions are the same the hiding power will vary with the refractive index and as I have found that artificially produced crystalline titanium compounds possess greater hiding power than the corresponding amorphous compounds, it will be advantageous to convert such compounds into the crystalline form before they are used as pigments.

As the titaniferous materials found in nature as well as those obtained as by-products in certain technical processes, for example in the treatment of bauxite, generally are in the tetravalent form, one step of my process will be a reducing operation in which the tetravalent titanium is reduced to trivalent or divalent titanium. The reducing agent may be a solid such as carbon or a reducing gas such as carbon monoxid, hydrogen or others. All the above mentioned titaniferous materials may be used as raw materials for my process, but as they generally contain impurities such as iron, the color of the products obtained will vary according to the contents of impurities. In order to obtain a comparatively pure product I may use as a raw material for my process titanium hydrates such as are obtained by precipitation from titanium sulfate or titanium chlorid solutions, or the $TiO_2$ obtained by calcination of such titanium hydrates.

In the following specific example of my process I will use as a raw material amorphous titanium dioxid, containing a small amount of ferric oxid as an impurity.

In order to carry out my invention I then proceed as follows:

A portion of amorphous $TiO_2$ containing approximately 0.5% $Fe_2O_3$ is mixed with pulverized carbon in a quantity varying with the degree of reduction desired. I prefer to obtain a reduction of about 10% of the $TiO_2$ present, and then use one part by weight of carbon to ten parts by weight of $TiO_2$ to be reduced. The amount of carbon necessary for reduction will however vary according to the apparatus in which the reduction is carried out, as more or less carbon will combine with the oxygen of the air originally present in the reduction chamber. Generally the above mentioned proportion gives a good result.

The mixture of $TiO_2$ and carbon is placed in a furnace preferably an electric furnace and the temperature raised to approximately 800° C. Reduction will then take place resulting in the formation of $Ti_2O_3$ and CO, possibly also other oxids of titanium, such as $Ti_3O_5$. After treatment at 800° C. for about one hour the reaction will be complete, and the product obtained, consisting of about 90% $TiO_2$ and about 10% amorphous $Ti_2O_3$ mixed with, or in chemical combination with or in solid solution with other oxids of titanium, may be removed from the furnace. I prefer, however, to continue the heating, gradually raising the temperature of the furnace until a sample of the product shows that the $Ti_2O_3$ and the other oxids of titanium have wholly or partly been converted to the crystalline form. This is easily determined by observation of the sample under a microscope in polarized light. I have found that about one hour's treatment at 900–1000° C. in most cases is sufficient to give the product a crypto- or microcrystalline structure, and I prefer then to interrupt the treatment before the crystals grow larger.

Instead of first heating to about 800° C. and then after one hour's treatment raising the temperature, I may raise the temperature directly to 900-1000° C. if a crystalline product is desired. Both reduction and crystallization will then have taken place after treatment for about one hour. The product is now removed from the furnace and allowed to cool. It is then subjected to pulverization such as is common practice with pigments. I have found that the crystallization process may be accelerated if I add to the mixture in the furnace small amounts (0.5%-5%) of a catalyst such as ammonium fluorid or zinc chlorid.

The resulting product is a blue to violet powder with a refractive index of the same order as that of rutile (2.7) and shows the analysis of 10% $Ti_2O_3$ and 90% $TiO_2$, the 90% including the iron present as an impurity.

My product forms an excellent pigment and is very resistant to physical and chemical actions, it may further be mixed with other pigments or fillers without undesirable reactions taking place, and may be used for all the same purposes as the commonly known pigments.

The foregoing detailed description has been given for clearness of understanding and no undue limitation should be deduced therefrom, but the appended claims should be construed as broadly as permissible in view of the prior art.

What I claim as new and desire to secure by Letters Patent of the United States is:

1. Process of producing titanium pigments from titaniferous materials, which comprises heating said materials together with a reducing agent until titanium is present in the trivalent form.

2. Process of producing titanium pigments from titaniferous materials, which comprises heating said materials together with a reducing agent until titanium is present in the trivalent form, and continuing the heat treatment until crystallization of the trivalent titanium compounds takes place.

3. Process of producing titanium pigments from titaniferous materials comprising titanium dioxid, which comprises heating said material together with a reducing agent until a reduction takes place and $Ti_2O_3$ is formed.

4. Process of producing titanium pigments from titaniferous materials comprising titanium dioxid, which comprises heating said material together with a reducing agent until a reduction takes place and $Ti_2O_3$ is formed, and further continuing the heating until $Ti_2O_3$ and $TiO_2$ are converted to the crystalline form.

5. Process of producing titanium pigments from titaniferous materials comprising titanium dioxid, which comprises heating said material together with a reducing agent to 900-1000° C. and continuing the heating until a reduction takes place and $Ti_2O_3$ is formed and $Ti_2O_3$ and $TiO_2$ are converted to the crystalline form.

6. Process of producing titanium pigments from titaniferous materials comprising titanium dioxid, which comprises heating said material together with carbon to 900-1000° C. and continuing the heating until a reduction takes place and $Ti_2O_3$ is formed and $Ti_2O_3$ and $TiO_2$ are converted to the crystalline form.

7. A pigment containing a titanium oxygen compound in which titanium is present in a lower valence than the tetravalent form.

8. A pigment containing a titanium oxygen compound in which titanium is present in a lower valence than the tetravalent form and in a crystalline condition.

9. A pigment containing oxygen compounds of titanium in which the titanium is present in its tetravalent condition and also in lower valence.

10. A pigment containing an oxygen compound of tetravalent titanium and an oxygen compound of titanium of lower valence.

11. A pigment containing a titanium oxygen compound of tetravalent titanium and an oxygen compound of titanium of a lower valence in a crystalline condition.

12. A pigment containing a titanium oxygen compound in which titanium is present in a trivalent form.

13. A pigment containing a titanium oxygen compound in which titanium is present in a trivalent form and in a crystalline condition.

14. A pigment comprising the solid solution of $Ti_2O_3$ in $TiO_2$.

Signed at Christiania, Norway, on this 9th day of July, 1918.

VICTOR MORITZ GOLDSCHMIDT.